United States Patent [19]

Tamai

[11] 4,229,751

[45] Oct. 21, 1980

[54] INK JET HEAD

[75] Inventor: Masayoshi Tamai, Ebina, Japan

[73] Assignee: Xerox Corporation, Stamford, Conn.

[21] Appl. No.: 34,835

[22] Filed: Apr. 30, 1979

[30] Foreign Application Priority Data

May 4, 1978 [JP] Japan .................................. 53-53492

[51] Int. Cl.[3] .............................................. G01D 15/18

[52] U.S. Cl. ................................................. 346/140 R

[58] Field of Search ..................................... 346/140 R

[56] References Cited

U.S. PATENT DOCUMENTS 4,131,899 12/1978 Christou .......................... 346/140 R

*Primary Examiner*—George H. Miller, Jr.

[57] ABSTRACT

A head for use in a pressure pulse drop-ejector system including a front plate formed with a nozzle, a resilient plate disposed in spaced relation by a thin partition wall to form an ink chamber between the front plate and the resilient plate, an electrostrictive element laminated on the surface of the resilient plate opposite the surface facing the front plate for deforming the resilient plate toward the front plate on application of electric field. This design allows for the use of a very thin gasket, which will form a very shallow ink chamber, which improves device operation and yet remains easy to assemble.

3 Claims, 5 Drawing Figures

INK JET HEAD

The invention can be utilized in any pressure pulse drop-ejector system; however, the greatest benefits are realized when the heads of this invention are used in an ink jet recording system. Accordingly, the invention will be described in connection with an ink jet recording system.

One problem with prior art ink jet heads is that air becomes ingested into the ink supply chambers, which slows or stops system response as explained herein. The present invention not only provides an ink jet head, which minimizes air ingestion but is also generally useful because of its ease of fabrication.

FIG. 1 is a sectional view of a prior art pressure pulse ink jet head.

FIGS. 2*a*–*c* show schematically how the operation of the FIG. 1 prior art ink jet head can ingest air.

Figure 5:
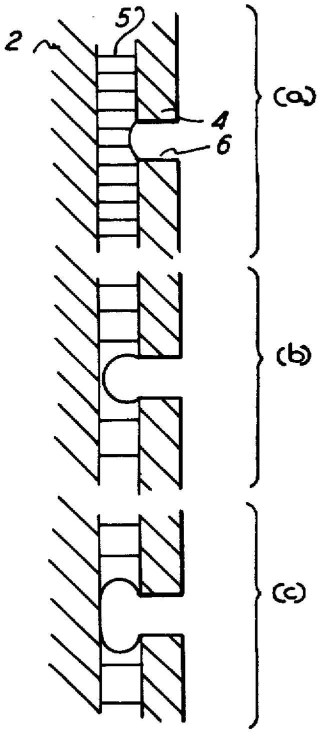

FIGS 5*a*–*c* show schematically how the head of the present invention can prevent or minimize air ingestion.

The invention relates to a head for use in an ink jet printer adapted to generate ink droplets on a recording paper sheet to form information thereon in accordance with, for example, a video signal.

Several kinds of ink jet printers are well known in the art. The present invention is particularly well suited for use in a pressure pulse type ink jet printer of the drop-on-demand type; that is, a single droplet is expressed from the jet each time the driving force is stimulated in response to an input signal. The head could, of course, also be used in the kind of ink jet system wherein droplets of ink are continuously produced, and the droplets are, for example, electrostatically deflected to form an image.

Figure 1:
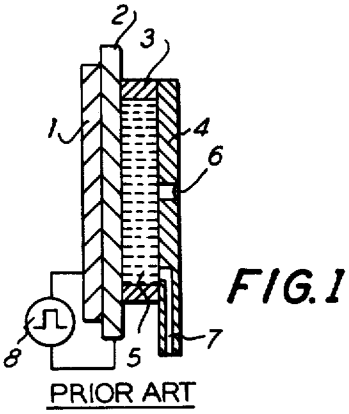

Referring now to FIG. 1, there is shown a prior art pressure pulse type ink jet printer, which comprises electrostrictive or piezoelectic member 1, also generally referred to as an electromechanical transducer element; a resilient member 2, which is in contact with ink in ink chamber 5; resilient member 2 forming a bimorph-type vibrator with electrostrictive element 1; an ink jet head base member 3 formed with an ink chamber 5; a front plate 4 formed with nozzle 6; and an inlet pipe 7 for supplying ink. When a voltage is applied to the electrostrictive element 1, the resilient plate 2, having its periphery fixed to the base member 3, is deformed with its center thrusting into the ink chamber 5 so as to reduce the inside volume of the ink chamber 5 and thus increase the pressure therein. This causes the ink level surface to project from the nozzle 6 and finally ink droplets to be expelled from nozzle 6. When the voltage is reduced, the resilient plate returns to its original position.

Figure 2:
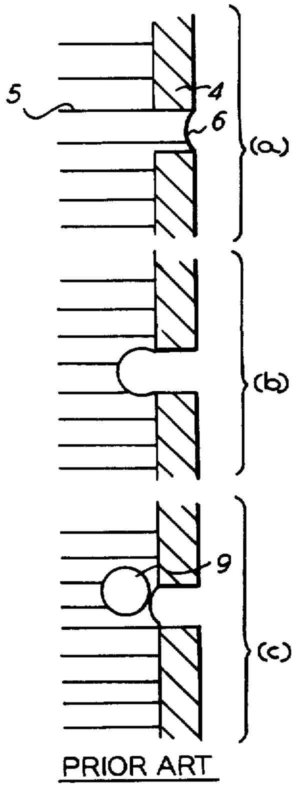

One of the problems associated with such conventional prior art pressure pulse type ink jet printers is created when the ink meniscus returns too far into the ink chamber. This can be caused, for example, by ink surface tension and viscosity changes due to temperature changes. If the meniscus returns too far into the ink chamber, bubbles are introduced into the ink chamber 5 as shown in FIG. 2.

Referring now to FIG. 2*a*, there is shown the desired returning point of the meniscus into nozzle 6. FIG. 2*b* shows an acceptable condition. However, FIG. 2*c* represents the case where the surface of the ink returned so far into the ink chamber that a bubble 9 is produced. The presence of air bubbles affects the response of the system because they are compressible and can even prevent sufficient pressure from being generated within chamber 5 to eject a droplet from nozzle 6.

Figure 3:
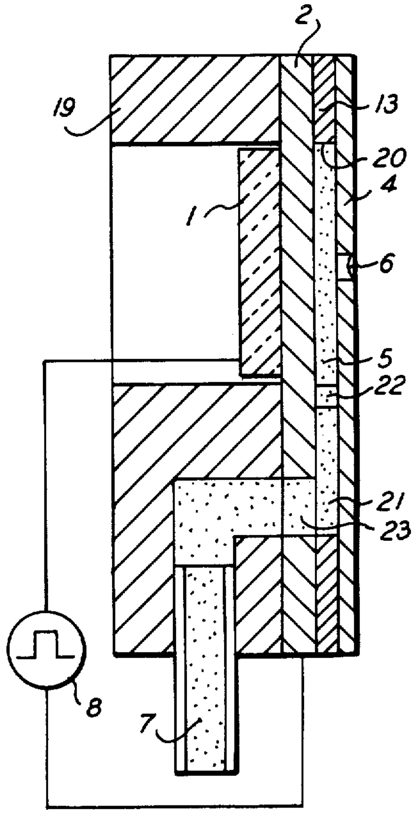
FIG. 3 is a sectional view showing a preferred embodiment of an ink jet head in accordance with the present invention.

Referring now to FIG. 3, a vibrating plate composed of an electrostrictive element 1 and resilient plate 2 is fixed to a base member 19. This allows an extremely thin spacer or partition wall 13 to be used. For example, gasket or spacer 13 can be formed of a plate having a thickness substantially equal to or even less than the diameter of nozzle 6. The resilient plate 2 and the front plate 4 are bonded to gasket 13 to form ink chamber 5 therebetween.

Figure 4:
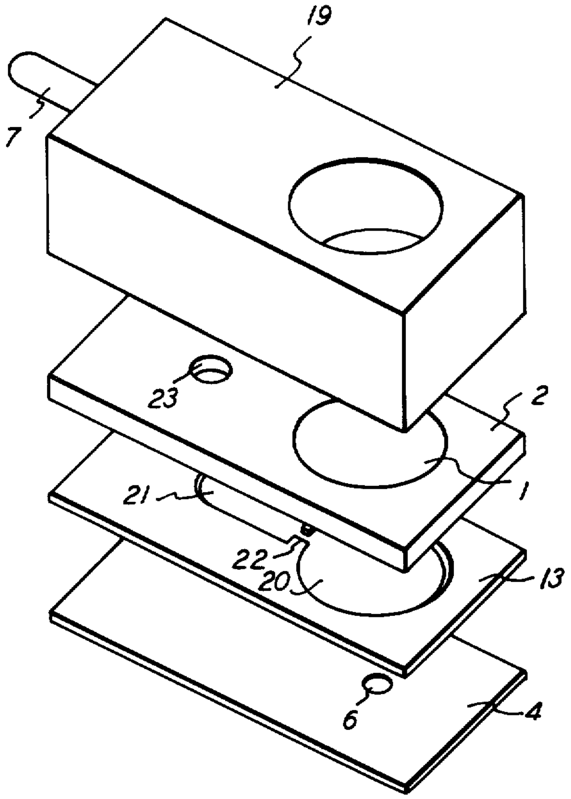
FIG. 4 is an exploded perspective view of the ink jet head of FIG. 3.

Referring now to FIG. 4, the gasket 13 has a hole or opening 20 sized to be approximately equal to the electrostrictive element 1. Opening 20 is connected through a neck portion 22 to a passage 21 leading via channel 23 and tube 7 to an ink supply (not shown). Preferably, the width of the neck portion 22 is about the same size as the diameter of nozzle 6. If the neck portion 22 is too large, pressure generated by electrostrictive element 1 will pass into the ink supply rather than being transmitted to the ejected droplet. Similarly, if the neck portion 22 is too small, insufficient ink is supplied to form drops, and air ingestion will occur. Generally, the neck portion area is from about equal to about two or three times the cross-sectional area of the droplet nozzle 6. Referring now to FIG. 5*a*, there is shown the normal meniscus at rest. FIG. 5*b* shows a further stage of liquid retreat into the ink chamber 5. FIG. 5*c*, however, represents what happens when the liquid retreats further into the ink chamber. The bubble cannot form because the thickness or depth of ink chamber 5 is insufficient to allow the bubble to form and to move into the ink.

An example of an ink jet head made in accordance with the present invention is as follows:

Base member 19 is formed from a 3 mm thick aluminum plate. The vibrating or pulsing member is made by bonding a 5 mm diameter by 0.3 mm thick piezoelectric electrostrictive element 1 to a 0.4 mm thickness SVS 304 stainless steel resilient plate 2. The resilient plate 2 is placed over gasket or spacer 13 to form one wall of the ink chamber 5. Gasket or spacer 13 is formed of 0.05 mm thick aluminum plate by photoetching. The width of supply passage 21 is 1 mm, and the width of the neck portion 22 is 0.1 mm. The front plate 4 is made of a 0.03 mm thick SVS 304 stainless steel plate with a 0.05 mm diameter nozzle formed by photoetching. Epoxy adhesive has been found to provide excellent bonding between the various members of the present ink jet head. Obviously, more than one hole can be made in plate 4 through which droplets can be expressed. Also, a number of heads can be formed into an array where desired.

Although specific components have been set out above, other modifications can be made where desired and still fall within the scope of the present invention. For example, magnetostrictive or mechanical drivers can be utilized in place of the electrostrictive element described herein. Also, spacer 13 could be an integral part of resilient plate 2 or front plate 4.

What is claimed is:

1. In an ink jet head including a front plate formed with a nozzle, a resilient plate disposed in spaced relation with the front plate so as to form an ink chamber therebetween, an electrostrictive element laminated to the side of the resilient plate which faces away from said front plate for deforming the resilient plate into the ink chamber, the ink jet head characterized in that the resilient plate is fixed to a base member, the base member being disposed at the outer periphery of the electrostrictive element and further characterized in that said ink chamber is formed by a spacer positioned between the front plate and the resilient plate.

2. The ink jet head of claim 1 wherein said spacer has a thickness about equal to the diameter of said nozzle.

3. The ink jet head of claim 1 wherein said ink chamber includes a restricted area, said restricted area having a cross-sectional area of from about equal to, to about three times the cross-sectional area of said nozzle.

* * * * *